US009583020B1

(12) United States Patent
Kronfeld et al.

(10) Patent No.: US 9,583,020 B1
(45) Date of Patent: Feb. 28, 2017

(54) SIMULATOR SYSTEM FOR SIMULATING WEATHER (71) Applicant: Rockwell Collins, Inc., Cedar Rapids, IA (US)

(72) Inventors: Kevin M. Kronfeld, Cedar Rapids, IA (US); Arlen E. Breiholz, Cedar Rapids, IA (US); Brian E. Planz, Richmond, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 164 days.

(21) Appl. No.: 13/691,581

(22) Filed: Nov. 30, 2012

(51) Int. Cl.
*G09B 9/16* (2006.01)
*G09B 19/00* (2006.01)
*G09B 9/30* (2006.01)
*G09B 9/20* (2006.01)

(52) U.S. Cl.
CPC .............. *G09B 19/00* (2013.01); *G09B 9/16* (2013.01); *G09B 9/206* (2013.01); *G09B 9/301* (2013.01)

(58) Field of Classification Search
CPC .......... G09B 9/08; G09B 19/165; G09B 9/00; G09B 9/301; G09B 9/206; G01W 1/10
USPC .................. 434/28, 29, 30, 35–52; 702/3
See application file for complete search history.

(56) References Cited

U.S. PATENT DOCUMENTS

| | | | | |
|---|---|---|---|---|
| 4,937,447 A * | 6/1990 | Barrett | ...................... | 250/339.04 |
| 5,317,689 A * | 5/1994 | Nack | ........................ | G06T 15/06 345/505 |
| 5,598,359 A * | 1/1997 | Montag | ................... | G06T 11/001 434/2 |
| 5,630,718 A * | 5/1997 | Montag et al. | .................... | 434/2 |
| 6,077,077 A * | 6/2000 | Geipe | ............................. | 434/30 |
| 6,266,063 B1 * | 7/2001 | Baron | ..................... | G06T 17/05 345/419 |
| 6,558,164 B2 * | 5/2003 | Raha | .............................. | 434/62 |
| 6,563,452 B1 * | 5/2003 | Zheng | ..................... | G01S 7/003 342/195 |
| 6,683,609 B1 * | 1/2004 | Thompson et al. | .......... | 345/419 |
| 6,965,816 B2 * | 11/2005 | Walker | ............................ | 701/16 |
| 7,077,749 B1 * | 7/2006 | Wang | ...................... | G01W 1/10 463/30 |
| 7,269,539 B2 * | 9/2007 | Wang | ................................ | 703/2 |
| 7,307,576 B1 * | 12/2007 | Koenigs | ............... | G01S 13/953 342/26 B |

(Continued)

*Primary Examiner* — Sam Yao
*Assistant Examiner* — Michael Humphrey
(74) *Attorney, Agent, or Firm* — Donna P. Suchy; Daniel M. Barbieri (57) ABSTRACT

One embodiment of the present disclosure relates to a method of simulating a weather pattern for use in a simulator environment. The method includes receiving an input corresponding to a desired weather event and determining a set of weather parameters pertaining to the desired weather event. The method further includes searching a weather event database for a matching weather event. The weather event database includes weather data for a plurality of weather events. The method includes identifying the matching weather event. The matching weather event includes at least a portion of the set of weather parameters pertaining to the desired weather event. The method includes receiving weather data corresponding to the matching weather event. The method further includes creating a model of the matching weather event.

20 Claims, 4 Drawing Sheets

(56) References Cited

U.S. PATENT DOCUMENTS

| | | | |
|---|---|---|---|
| 7,675,461 B1* | 3/2010 | McCusker | G01S 7/20 340/945 |
| 7,715,978 B1* | 5/2010 | Wenger | G01C 23/00 340/977 |
| 8,229,718 B2* | 7/2012 | Heil et al. | 703/6 |
| 8,466,874 B1* | 6/2013 | Gardiner | G09G 5/06 315/13.1 |
| 8,533,723 B1* | 9/2013 | Badenell et al. | 718/104 |
| 9,092,888 B1* | 7/2015 | Gardiner | G06T 17/00 |
| 9,223,020 B1* | 12/2015 | Crosmer | G01S 13/951 |
| 2002/0018066 A1* | 2/2002 | Vizer | G06T 17/20 345/428 |
| 2002/0072414 A1* | 6/2002 | Stylinski et al. | 463/42 |
| 2003/0054324 A1* | 3/2003 | Fountain | G09B 9/16 434/37 |
| 2004/0103108 A1* | 5/2004 | Andreev et al. | 707/100 |
| 2005/0114102 A1* | 5/2005 | Gilbert | G01W 1/10 703/2 |
| 2006/0266950 A1* | 11/2006 | Acevedo | G01N 21/33 250/372 |
| 2007/0020588 A1* | 1/2007 | Batcheller et al. | 434/30 |
| 2009/0220929 A1* | 9/2009 | Daniel | 434/362 |
| 2010/0194628 A1* | 8/2010 | Christianson | G01S 13/953 342/26 B |
| 2010/0245164 A1* | 9/2010 | Kauffman | G01S 7/22 342/26 B |
| 2010/0245165 A1* | 9/2010 | Kauffman | G01S 13/953 342/26 B |
| 2010/0266991 A1* | 10/2010 | Gregoire | G09B 9/301 434/38 |
| 2011/0171612 A1* | 7/2011 | Gelinske et al. | 434/35 |
| 2013/0192464 A1* | 8/2013 | Asmis | 95/148 |
| 2014/0039733 A1* | 2/2014 | Ren et al. | 701/14 |
| 2016/0055275 A1* | 2/2016 | Wang | G06F 17/5009 703/8 |

* cited by examiner

SIMULATOR SYSTEM FOR SIMULATING WEATHER

BACKGROUND

The present disclosure generally relates to the field of aviation simulators. More specifically, the present disclosure relates to simulating weather events in an aircraft simulator.

Airline trainers, pilots, and military trainers desire the ability to be trained or to train pilots and other aircraft operators in realistic environments. The simulation of weather radar returns and weather models are typically used as part of the aircraft simulation process. Accurate simulation of weather patterns and events are important to both the training of pilots and aircraft operators and to the development of new algorithms for improving weather radar performance.

Achieving weather models for use with aircraft simulators is presently a time consuming and cumbersome task that often results in inaccurate, imprecise, and/or non-realistic weather simulations during simulated flights. Weather simulations are presently achieved by searching archived weather data, manually viewing the weather data, and manually illustrating multiple layers of weather contours at various points of time to illustrate a three-dimensional progression of a weather event (e.g., a storm cell). A computer then processes the contours into data for aircraft simulator visuals for simulator displays. Other weather simulations are achieved by inputting a series of desired weather event details into a super-computer for processing. The super-computer processing results in data for aircraft simulator gauges and visuals for simulator displays. Both types of weather simulation techniques can be time consuming, manually intensive, and often generate unrealistic weather visuals on simulator displays.

Therefore, there is a need for providing accurate and realistic weather simulations for flight simulators without the time consuming process of manual transcribing of weather patterns and the unrealistic visuals. There is also a need for a search tool that searches historic weather data to locate realistic weather events for aircraft simulators.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the present disclosure relates to a method of simulating a weather pattern for use in a simulator environment. The method includes receiving an input corresponding to a desired weather event and determining a set of weather parameters pertaining to the desired weather event. The method further includes searching a weather event database for a matching weather event. The weather event database includes weather data for a plurality of weather events. The method includes identifying the matching weather event. The matching weather event includes at least a portion of the set of weather parameters pertaining to the desired weather event. The method includes receiving weather data corresponding to the matching weather event. The method further includes creating a model of the matching weather event.

Another embodiment of the present disclosure relates to a method of cataloging weather events in a searchable database and searching the searchable database for a matching weather event. The method includes receiving a plurality of weather data sets pertaining to a plurality of weather events. Each weather data set of the plurality of weather data sets pertains to a weather event. Each weather data set includes data associated with the weather event. The method includes identifying a weather parameter for each weather event. The method further includes tagging each weather data set with the weather parameter. The method includes storing the plurality of weather data sets in the searchable database. The method further includes indexing each weather data set based on the weather parameter. The method includes querying the database to locate a matching weather data set.

Yet another embodiment of the present disclosure relates to a simulator system. The simulator system includes a simulator configured to receive an input corresponding to a desired weather event. The simulator is further configured to simulate the desired weather event in a simulated environment. The simulator system includes a display configured to display the desired weather event in the simulated environment. The simulator system further includes a database containing weather data. The weather data pertains to a stored weather event. The simulator is configured to locate the weather data pertaining to the stored weather event. The simulator is configured to simulate the desired weather event based at least in part on the weather data such that the desired weather event at least partially models the stored weather event.

Alternative exemplary embodiments relate to other features and combinations of features as may be generally recited in the claims.

BRIEF DESCRIPTION OF THE FIGURES

The invention will become more fully understood from the following detailed description, taken in conjunction with the accompanying drawings, wherein like reference numerals refer to like elements, in which.

DETAILED DESCRIPTION OF THE EXEMPLARY EMBODIMENTS

Before turning to the figures, which illustrate the exemplary embodiments in detail, it should be understood that the application is not limited to the details or methodology set forth in the description or illustrated in the figures, but should be construed in accordance with the language in the claims. It should also be understood that the terminology is for the purpose of description only and should not be regarded as limiting.

Referring generally to the figures, systems and methods for providing weather simulations for aircraft simulators are shown and described. The systems and methods are used to provide realistic simulations of a weather events during aircraft simulation operations. The aircraft simulator may be part of an aircraft control center of an aircraft or a standalone training unit. The aircraft simulator presents users realistic simulations of weather events using the systems and methods described herein. Although described as being used with an aircraft simulator, it should be understood that such weather simulations may be utilized in any other type of simulation system without departing from the scope of the present disclosure (e.g., driving simulators, weather prediction models, etc.).

One aspect of the invention relates to the use of a weather event database that contains historic weather event data that is cataloged based on various weather parameters relating to the historic weather events. The parameters identify information relating to the historic weather events, including, but not limited to, general storm characteristics, a general atmospheric condition, a storm top height, rate of convective growth or decay of the storm, wind, temperature, altitude, geographic locations, geographic areas, precipitation rate, precipitation type, number of storm cells, storm cell severity, the height of the 500 mb pressure level of the storm, lightning density, max wind speeds, average wind speeds, wind directions, icing information, freezing level information, turbulence parameters, date of weather event, time of weather event, environmental conditions that gave rise to the weather event, tornado activity, storm structural considerations (e.g., storm cell or hurricane system), dew points, and/or surface wind flows. Data pertaining to the historic weather events is archived in a searchable database. These parameters are used to catalog the historic weather event data such that a user or a training system can search for specific historic weather events based on desired weather event features. Identified historic weather events returned as search results may then be used for the purposes of providing realistic weather simulations to an aircraft simulation system.

Another aspect of the invention relates to the generation of a realistic weather simulation. A training system determines a set of parameters for which to provide a weather simulation. These parameters are decided based on information pertaining to a weather forecast or a user input. The training system searches a database containing historic weather data to identify a matching weather event. After retrieving the matching weather event based on the parameters, a simulation of the weather event is generated. The simulation includes radar display data, aircraft display data, aircraft gauge data, and any other data required for a flight simulation by the aircraft simulator as described below.

Another aspect of the invention relates to the use of video imagery in an aircraft simulation system. A camera and a radar unit are configured to capture image data and radar data of a weather event (e.g., a storm) upon the detection of a desired weather event. The radar data may be volume scan radar data or single elevation scan radar data. The camera unit and the radar unit may be two separate devices or systems that generate data (e.g., a stand alone camera unit that generates image data and a National Weather Service radar that generates radar data). The image data is analyzed for distinctive atmospheric features associated with severe weather, including wall clouds, thunderheads, icing conditions, down bursts, squall lines, tornados, hurricanes, or other atmospheric features that identify a desired type of weather pattern. The identification of the patterns, and the parameters of the weather event, are stored and used in the same manner as and/or in conjunction with the archived weather events as described above and below.

Figure 1:
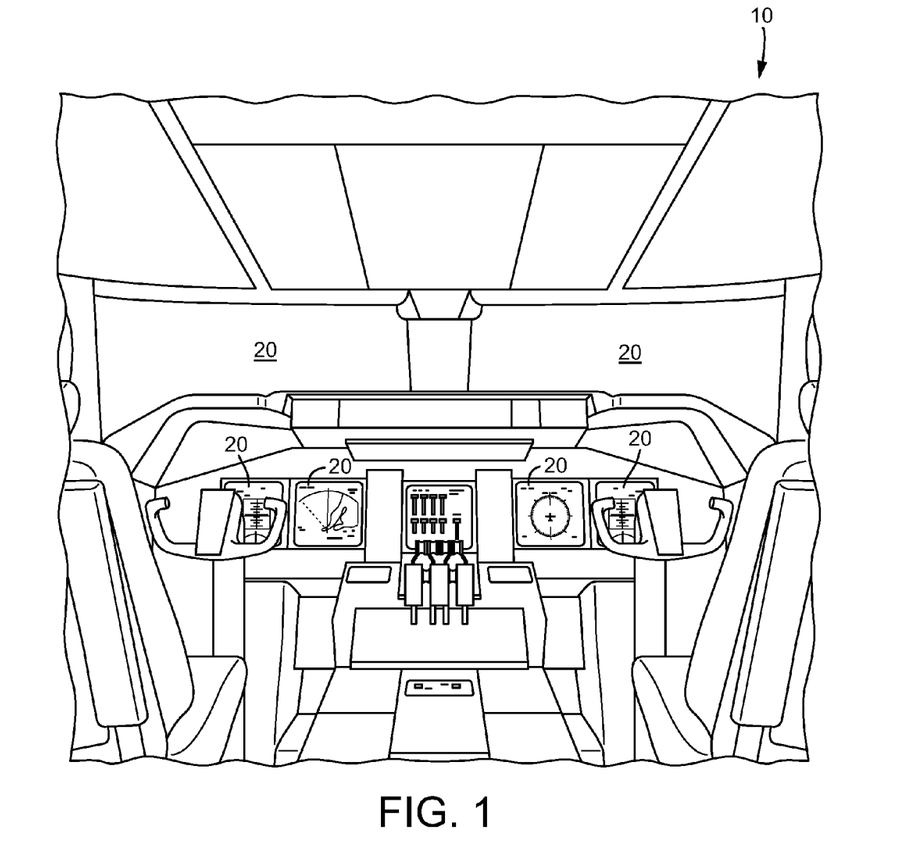
FIG. 1 is an overview of an exemplary aircraft simulation system.

Referring to FIG. 1, an illustration of an aircraft simulator system 10 is shown. Aircraft simulator system 10 is a training system for pilots and other aircraft personnel. Aircraft simulator system 10 includes various modules 20. Modules 20 include, but are not limited to, simulated aircraft displays, simulated aircraft gauges, simulated aircraft sensor outputs, audio input and output devices (e.g., microphone, speakers, headsets, etc.), and user inputs (e.g., knobs, levers, switches, etc.). The simulated aircraft displays and aircraft gauges include any number of gauges, ground-based radar displays, airborne radar displays, weather sensor outputs, or other displays that provide a user of aircraft simulator system 10 with information relating to the simulated operation of an aircraft. For example, modules 20 may include airborne radar displays indicating current local weather conditions within a simulated weather model, infrared displays, lightning strike sensors, and other associated weather-related sensors. The simulated aircraft displays may also include displays for simulating any outside visuals (e.g., screens reproducing what a pilot would see out of the windows of the simulated aircraft).

Aircraft simulator system 10 is shown as an example of a system that may be used with the systems and methods described herein. It should be understood that the systems and methods described herein can be used in aircraft simulators of all types (e.g., commercial jet, recreational aircraft, military aircraft, helicopters, etc.). Further, it is contemplated that analogous systems and methods can be used in a variety of other simulators for training and other purposes (e.g., ground vehicles, storm spotter training, military operations training, etc.). Still further, it is contemplated that multiple types of simulations can be simultaneously operated in a time-synchronized manner. For example, a first user may be in an aircraft simulation and a second user may be in a ground based simulation, and both simulations occur such that each user is in the same environment at the same time. However, due to different positions within the common simulated environment, each user may be presented different simulated module outputs.

Figure 2:
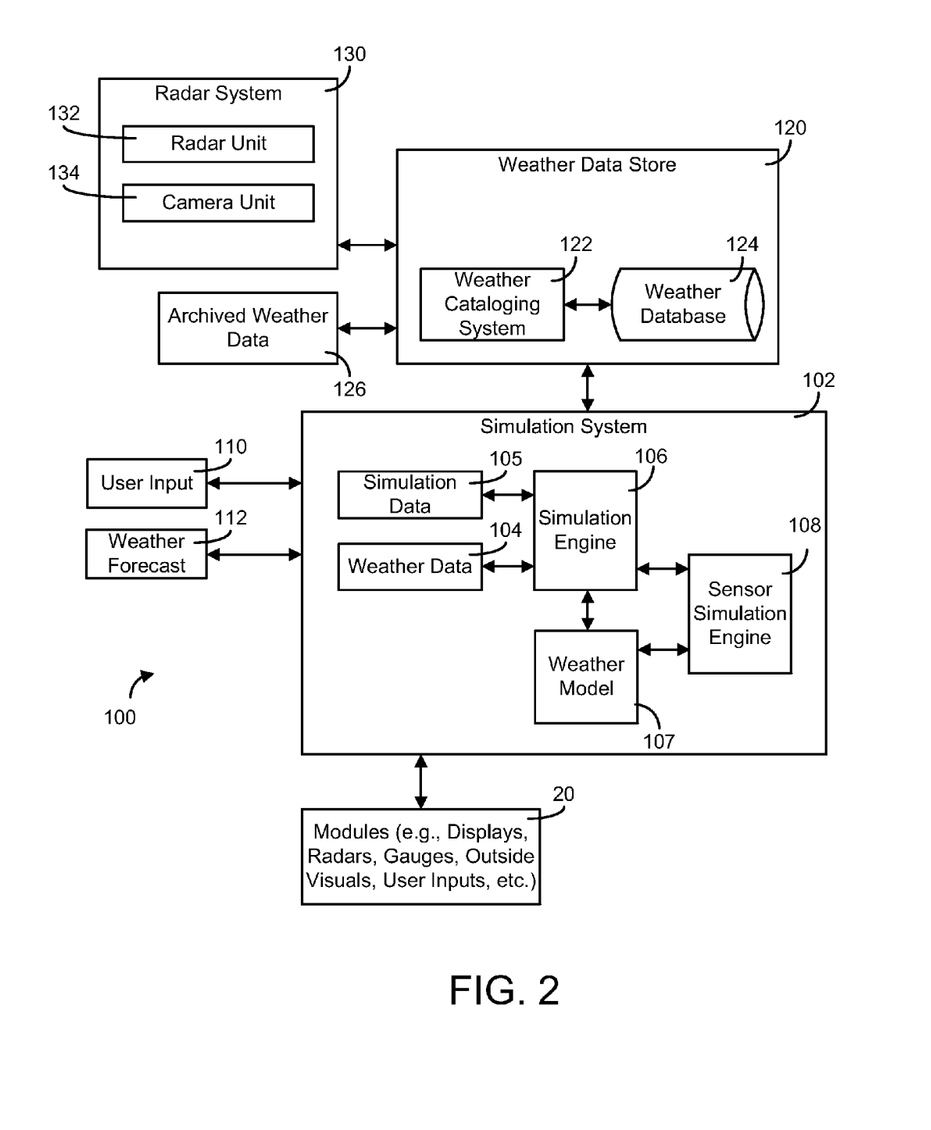
FIG. 2 is a block diagram overview of an exemplary aircraft simulation system.

Referring now to FIG. 2, an overview of an exemplary environment and weather simulation system 100 is shown. System 100 generally includes simulation system 102. Simulation system 102 is configured to create a simulated weather model and to provide a simulated environment, such as an aircraft simulation, for a user (e.g., a pilot or other aircraft operator). The weather model may be a spatiotemporal weather model. The simulation of the environment includes both a simulation of a spatiotemporal weather model and a simulation of various user displays and sensor outputs based on the spatiotemporal weather model and user inputs. Accordingly, simulation system 102 is configured to generate a simulation including simulations of a weather model, simulation of a flight through the weather model, and simulations of various displays and sensors based on the simulated weather model. It should be understood that system 100 may be modified to provide non-aircraft based simulations, such as a weather spotting simulation, a ground vehicle simulation, a military operations simulation, or any other simulation.

Simulation system 102 includes weather data 104, simulation data 105, simulation engine 106, weather model 107, and sensor simulation engine 108. Simulation engine 106 is configured to generate weather model 107 based on weather data 104 and an aircraft flight simulation through weather model 107 based on simulation data 105. Weather model 107 is discussed as being a spatiotemporal weather model, however, it should be understood that weather model 107 may be a two-dimensional or three-dimensional weather model. The aircraft flight simulation includes one or more aspects of an aircraft flight or other aircraft operation during the specified weather conditions. Simulation engine 106 utilizes weather data 104 in creating a spatiotemporal weather model for the simulation environment pertaining to user specified weather conditions. Weather data 104 relates to desired weather events to be simulated as indicated by user input 110 or as indicated by parameters pertaining to a weather forecast 112. User input 110 corresponds to desired weather event parameters (e.g., features of a desired storm to be simulated), a particular time, date, and location of a historic weather event, or any other input that identifies a desired weather event. A provided weather forecast 112 includes weather forecast parameters (e.g., types of weather warnings and watches, types of actual weather observed, instability parameters, skew-T data, convective available potential energy calculations, lifted index calculations, lifted condensation level calculations, etc.). The weather forecast parameters are manually provided by a user. Alternatively, the weather forecast parameters are retrieved from a third-party weather service. Simulation system 102 utilizes user input 110 and/or weather forecast 112 to identify and retrieve weather data 104 from weather data store 120. The retrieved weather data 104 is used to create weather model 107 for the simulated environment.

Simulation engine 106 further utilizes simulation data 105 (e.g., information pertaining to the type of aircraft, aircraft capabilities, geographic location, time of year, time of day, physics engine data, etc.) in creating an aircraft flight simulation scenario. In order to create a realist flight simulation, simulation system 102 must populate and regularly update modules 20. Depending on the module, a particular display may be populated directly from the spatiotemporal weather model (e.g., a ground based radar display). However, in many situations, populating a particular module requires a simulation based at least in part on the created spatiotemporal weather model. For example, as a pilot is flying through weather model 107, the airborne based radar display (e.g., X-band radar display) will change depending on the position of the plane within the weather model and any in-flight adjustments made by the user regarding the radar display (e.g., a radar tilt setting). Accordingly, simulation system 102 includes sensor simulation engine 108. Sensor simulation engine 108 performs a second simulation based on weather model 107 to populate and update modules 20 throughout the duration of the flight simulation. Examples of modules 20 that may be regularly updated by sensor simulation engine include, but are not limited to, outside visuals (e.g., displays recreating what a pilot will see out of the windscreen during a flight), air-based radar displays (e.g., X-band radar displays), LIDAR displays, infrared sensor outputs, lightning sensor outputs, barometer outputs, wind sensor outputs, and haptic or tactile feedback devices (e.g., a device to shake the simulator cockpit in the event of simulated turbulence).

System 100 includes weather data store 120. Weather data store 120 includes weather cataloging system 122 and weather database 124. Weather database 124 receives weather event data sets from archived weather data 126 and/or from at least one radar system 130. Radar system 130 can be located remotely from system 100. It is contemplated that weather data store 120 receives weather event data from multiple radar systems. Each radar system 130 may be strategically placed in geographic locations that are prone to desired weather events (e.g., placing a radar systems in a geographic locations prone to tornadoes, blizzards, hurricanes, etc.). The weather event data is cataloged such that data pertaining to specific historic weather events (e.g., a specific storm cell or weather system) can be retrieved by simulation system 102 such that weather simulations are at least partially based on the weather event data. Sources of weather data sets are not limited to archived weather data 126 and radar system 130. Weather data store 120 may also receive weather data from airborne radar recordings (e.g., X-band radar recordings), LIDAR sensors, infrared sensors, lightning strike sensors, cockpit displays, barometers, wind sensors, satellite imaging systems, and/or any other source operable to supply weather related data useful in creating a spatiotemporal weather model. Further, it is contemplated that weather data from multiple sources may be used to create a single weather model such that data from one source supplements data from another source. In some situations, system 100 utilizes distributed data storage techniques such that weather data is retrieved from multiple storage units, which may be internal and/or external to system 100 (e.g., weather data store 120 and the National Climatic Data Center of the National Oceanic and Atmospheric Administration). The details of weather representation system are discussed below.

By using actual historic weather information with other simulation information, simulation system 102 provides a realistic aircraft flight simulation environment. The realistic aircraft flight simulation provides users with the opportunity for rehearsal of or training for flights in specific weather conditions. For example, if pilot is aware of an upcoming flight that will be affected by a forecasted weather system, the pilot can input the weather forecast into simulation system 102. Simulation system 102 will query weather data store 120 based on weather parameters extracted from the weather forecast. The weather parameters are used to identify a similar historic weather event having the same or similar parameters. The similar historic weather event data is returned to simulation system 102 where it is stored in weather data 104. Simulation engine 106 processes weather data 104 and to create weather model 107 based at least in part on the historic weather data provided by weather data store 120 and integrates weather model 107 into the simulation of the flight environment. Further, during the simulated flight, simulation system 102 utilizes sensor simulation engine 108 to perform additional simulations based on weather model 107 in order to provide accurate display and sensor outputs (modules 20) to the pilot during the flight. Accordingly, simulation system 102 provides the pilot a realistic flight simulation through the historic weather event, which closely approximates the flight through the forecasted weather event. Therefore, the user of simulation system 102 experiences as close a simulation as possible to the actual conditions he or she will experience in the upcoming flight.

Weather data store 120 is configured to retrieve historic weather data from archived weather data 126. Weather data store 120 retrieves and stores weather data sets from archived weather data 126 for particular weather events and stores data pertaining to the event in weather database 124. For example, weather data store 120 may retrieve weather data for a designated storm system. Archived weather data 126 may be data from a government agency (e.g., the National Climatic Data Center) or from a private weather record database or service. Other examples of archived weather data sources include, but are not limited to, the Rapid Update Cycle (RUC), the Weather Research and Forecasting Model (WRF), the Global Forecast System (GFS), the European Center for Medium-Range Weather Forecast (ECMWF), the United Kingdom Meteorology (UKMET), the Canadian GEMS, and the Navy Operational Global Atmospheric Prediction System (NOGAPS). Generally, weather data for each weather event includes radar data of the weather event and/or an archived model of a weather event. The radar data pertains to volume scans of weather events or single elevation scans of the weather event. The volume scan radar data represent successive sweeps from ground based radar made at successive elevations, which then are combined to provide a three-dimensional radar representation of the weather event. Alternatively, the radar data pertains to a single elevation scan of the weather event. The weather data for each weather event includes a succession of radar scans for a given weather event such that the evolution of the weather event is tracked with time. For example, the weather data may include a volume scan of a given weather event taken every five minutes for a three hour period. The radar data may be X-band, S-band, C-band, Ka-band, or any other form of weather imagery capable of outputting data relating to a volume scan. The radar data may be supplemented by time-synchronized video or images of the weather system. Alternatively or additionally, weather data sets include any of image data, video data, airborne radar data, satellite image data, LIDAR data, infrared sensor data, lightning strike sensor data, data recorded from cockpit displays, barometer data, wind sensor data, archived weather models, and any other data useful in creating a spatiotemporal weather model. Archived weather models may derive from archived weather data retrieved from any of the above noted weather data stores, from previous weather models created by system 100, and/or from weather models stored on any archived weather model store. The weather data retrieved from archived weather data 126 is analyzed. Weather parameters for the weather event are determined. The weather parameters are stored and indexed in weather cataloging system 122 such that the stored weather event is searchable by simulation system 102 or by a user.

Not all weather data from archived weather data 126 is stored and cataloged by weather data store 120. It should be appreciated that archived weather data 126 may include many weather data pertaining to weather events not useful in flight simulation scenarios (or other simulation scenarios) or weather data pertaining to non-event weather (e.g., clear skies). Accordingly, weather data store 120 locates and stores weather data pertaining to weather events that will be desirable for system 100 (e.g., weather pertaining to common flight situations or common flight training situations) or pertaining to weather events based on designated weather situations as indicated by a user of system 100. In either situation, weather data store 120 searches archived weather data 126 to locate the relevant weather events and the associated weather data. In an alternate arrangement, weather data store 120 pulls weather data for particular time periods. In yet another alternate arrangement, weather data store 120 uses another form of automated logic to determine which weather data to store in weather database 124 (e.g., data pertaining to weather events known to have caused plane crashes or other dangerous conditions) or to disregard (e.g., data pertaining to a weather event having identical or near identical weather parameters and characteristics as an already stored weather event).

In certain embodiments, weather data store 120 is configured to receive weather data from at least one radar system 130. Radar system 130 includes radar unit 132 and camera unit 134. It is contemplated that radar unit 132 and camera unit 134 may be separate devices such that radar unit 132 and camera unit 134 capture weather data pertaining to the same weather event at the same time, but from different locations. Alternatively, radar unit 132 and camera unit 134 are included within the same device. Radar system 130 may be located or positioned on an aircraft, at airports, at company facilities, in locations that are prone to unique or severe weather conditions, and/or in locations having high air traffic. Radar system 130 may be a permanent ground based system, a mobile ground based system, or a mobile aerial based system. Radar system 130 activates upon a trigger. The trigger may be a manual user trigger or an automatic trigger based on a detected weather condition. The detected weather condition may be detected from either radar data (e.g., red or yellow storm indicators contained within a live feed of weather radar imagery supplied by the National Weather Service) or image data (e.g., identification of an atmospheric feature relating to severe weather). Alternatively, both radar unit 132 and camera unit 134 are constantly recording data into rolling buffer memory, and upon detection of a trigger, data stored in the rolling buffer memory is permanently stored.

Upon activation, radar unit 132 is configured to capture radar data pertaining to a weather event over the course of time (e.g., a volume radar scan of the weather event every 5 minutes) to track the evolution of a weather event. The radar data corresponds to volume scan radar data. Alternatively, the radar data corresponds to single elevation radar scans. Radar unit 132 utilizes any of X-band, S-band, C-band, or Ka-band, or any other band of radar to capture radar data of the weather event. Camera unit 134 is configured to record image data pertaining to the weather event. Camera unit 134 is a high resolution camera. Camera unit 134 may contain multiple cameras pointed in different directions to capture image data pertaining to multiple views and perspectives of the weather event. Camera unit 134 is positioned such that image data relates to the atmosphere (e.g., positioned such that image data is captured from above the horizon and not on the ground located below the horizon). The image data is video data or a series of still images captured at a regular intervals. The image data is captured such that actual visual representations of the weather event are viewable alongside radar data. Radar system 130 provides both the image data and the radar data to weather data store 120. In an alternate arrangement, camera units are placed near already existing radar centers having accessible radar data stores or feeds (e.g., a camera unit is placed near a National Weather Service NexRad radar unit). Accordingly, the camera units provide the image data and radar data is taken from the already existing radar center (e.g., the National Weather Service). In this alternate arrangement, the clocks of the camera units are synchronized to the clocks of the radar units (e.g., a camera unit clock is synchronized to that National Weather Service radar system clock) such that image data and radar data can be synchronized.

Figure 3:
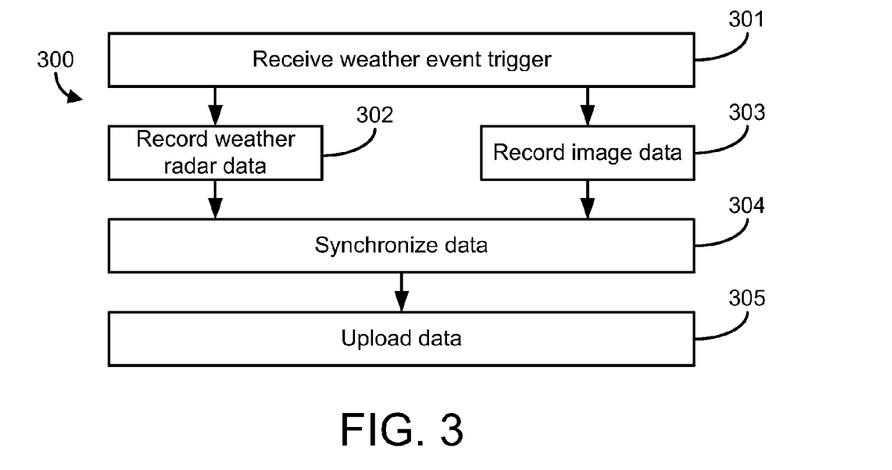
FIG. 3 is a flow chart of an exemplary process for detecting a weather event and uploading weather data and image data.

Referring to FIG. 3, a flow chart of a process 300 for detecting a weather event and uploading weather data and image data is shown. Process 300 is executed by a radar and camera system (e.g., radar system 130) or another system configured to detect a weather event, record radar data (e.g., data corresponding to volume scans or single elevation scans) pertaining to the weather event, and/or record image data pertaining to the detected weather event. First, a weather event trigger is received (step 301). The weather event trigger wakes a radar unit and a camera unit (e.g., radar unit 132 and camera unit 134). Alternatively, the radar and camera system continuously records radar data and image data into memory buffers that are periodically overwritten or discarded, and the weather event trigger serves as an indication that certain data stored in memory buffers surrounding the weather event trigger are to be permanently stored. The weather event trigger originates from a person monitoring the weather. As such, a person may indicate a capture request. Alternatively, the weather event trigger is automatic based on detected weather conditions. The weather conditions may be detected based on a third-party weather service (e.g., Weather.com® or AccuWeather.com®), based on sensors that are part of the device, based on atmospheric features corresponding to severe weather conditions, or based on certain weather radar imagery characteristics in the vicinity of the radar unit and/or the camera unit (e.g., red or yellow storm indicators contained within weather radar imagery supplied by the National Weather Service).

After receiving the trigger, radar data and image data pertaining to the weather event are simultaneously recorded and stored (steps 302 and 303). The radar data corresponds to a series of volume scans of the weather event taken at regular time intervals for the duration of the weather event (e.g., every 5 minutes). Alternatively, the data corresponds to a series of single elevation radar scans taken at regular time intervals for the duration of the weather event. The radar data includes time stamps such that the radar data can be matched and synchronized to corresponding image data. The image data corresponds to images of the weather event taken at the same time interval as the weather radar data such that each image or series of images corresponds to a single radar scan. The image data includes time stamps such that the image data can be matched and synchronized to corresponding radar data. Alternatively, the image data corresponds to a video capture of the weather event. The image data is captured through one or more cameras. The cameras are positioned such that the cameras record as much of the sky (and therefore the weather event) as possible, with minimal recording below the horizon (where the weather event has little effect on aircraft flight).

After the weather event has passed or a designated maximum time has passed (e.g., 3 hours), recording stops and the radar data and the image data are time synchronized (step 304) such that an image or an image stream corresponds to each radar scan. The files are uploaded to a data center (e.g., weather data store 120) (step 305). The time-synchronized files may be uploaded via a wireless connection or a wired connection. Alternatively, the files are stored locally on the device and is uploaded or transferred at regular intervals. At the data center, the data files may be stored, analyzed, cataloged, and indexed for searching. Optionally, the radar data and the image data are merged into a single file.

Weather data store 120 includes weather cataloging system 122. Weather cataloging system 122 catalogs and indexes all data and weather models pertaining to historic weather events stored in weather database 124 by identified weather parameters such that weather events stored in weather database 124 are searchable by the indexed parameters. Weather database 124 is populated from weather event data from archived weather data 126, radar system 130, and/or other sources of weather data and previously created weather models. The weather parameters used to identify specific weather events include, but are not limited to general storm characteristics, general atmospheric conditions, a storm top height, rate of convective growth or decay of the storm, wind, temperature, altitude, geographic locations, geographic areas, precipitation rate, precipitation type, number of storm cells, storm severity, the height of the 500 mb pressure level of the storm, lightning density, max wind speeds, average wind speeds, wind directions, icing information, freezing level information, turbulence parameters, date of weather event, time of weather event, environmental conditions that gave rise to the weather event, tornado activity, storm structural considerations (e.g., storm cell or hurricane system), dew points, and/or surface wind flows. Weather parameters are extracted from the stored weather data. Alternatively, the weather parameters are provided by a user after the user analyzes the stored weather data. In the event weather data includes image data (e.g., weather event data received from radar system 130), the image data can be analyzed to identify distinctive atmospheric features associated with severe weather (e.g., wall clouds, thunderheads, tornados, icing conditions, down bursts, squall lines, hurricanes, etc.) such that the distinctive characteristic can be added to the indexed parameters for the designated event. Accordingly, each weather event that is stored in weather database 124 is classified with as many parameters as possible such that simulation system 102 (or a user) can search weather database to identify weather events having an identified set of weather parameters or features, or events closely approximating the desired set of weather parameters or features. The weather parameters searched may relate to weather forecast parameters (as discussed above) pertaining to weather forecast 112 or an arbitrarily desired weather system received by user input 110.

The set of weather parameters associated with weather data and the weather data pertaining to a weather event are stored in a database. The database may be an object-oriented database. The sets of weather parameters are represented as objects, where the object may be one or more of a variable, a value, a function, a data structure, etc. Weather data and weather models may also be represented as a data structure of weather objects, as a three-dimensional or four-dimensional grid space of weather information, or as a combination of both. As a result, when information is retrieved from weather data store 120, data is extracted based on the value of the parameters and/or based on general weather event behavior. For example, simulation system 102 may receive data from weather data store 120 that meets a user desired specification of weather event severity and behavior. Further, the environmental conditions contained within the parameters (e.g., altitude, temperature, etc.) that gave rise to the weather event associated with the weather data may be used to identify and select the weather data.

Alternatively, the set of weather parameters may be presented and stored as a large vector (e.g., a one-dimensional array that includes a value for each weather parameter). A system accessing weather data store 120 (e.g., simulation system 102) searches weather data store 120 and retrieve weather data from weather database 124 that pertains to weather events including weather parameter values that match the parameter values of the search.

Figure 4:
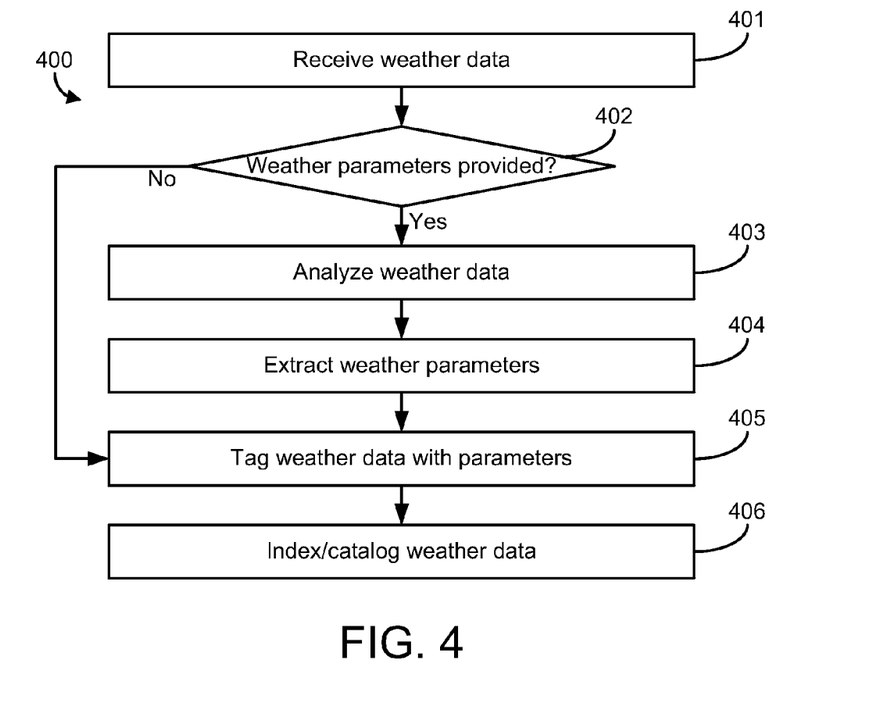
FIG. 4 is a flow chart of an exemplary process for cataloging and indexing stored weather event data in a searchable database.

Referring to FIG. 4, a process 400 of cataloging and indexing stored weather event data is shown. Weather data pertaining to a weather event is received at weather data store 120 (step 401). It is contemplated that weather data pertaining to a single weather event may be received from multiple sources (e.g., archived weather data 126 and the National Weather Service) such that a more thorough representation of the weather event is received. Weather data store 120 determines whether weather parameters of the event data are already provided (step 402). If weather parameters are not provided, weather data store 120 analyzes the weather data (step 403). Weather data store 120 analyzes radar data to extract any identifiable weather parameters, including any identifiable characteristics, that pertain to the weather event. An exemplary listing of possible weather parameters and characteristics is discussed above. Any pertaining parameters are identified and extracted (step 404). In some cases, weather parameters are provided with weather data, in which case, steps 403 and 404 are not necessary. Weather data store 120 tags the weather data with the parameters (step 405). The weather parameters are tagged in metadata contained within the weather data file pertaining to the weather event. The weather data pertaining to the event is indexed and cataloged based on the associated parameters (step 406). The association between the weather event and the parameters are stored in weather cataloging system 122 such that a user or simulation system 102 can query weather data store 120 to identify desired weather events based on an identified parameter or set of parameters.

Weather data that is stored, cataloged, and indexed in weather data store 120 is searchable and accessible by simulation system 102. As discussed above, simulation system 102 is configured to provide users aircraft simulations including accurate weather simulations. Simulation system 102 utilizes weather data from weather data store 120 to generate accurate and realistic weather simulations based on historic weather events. Generally, simulation system 102 retrieves desired weather event data, including radar data (e.g., volume scan data) and any corresponding image data, processes the weather event data, and outputs simulation data to various modules 20 utilized in the flight simulation.

Simulation system 102 is operable to simulate an environment, such as an aircraft flight, during a user desired weather event based on a future weather forecast. In many situations, a pilot is aware of future flights many days in advance of the scheduled flight. The pilot has the opportunity to access and to view weather forecasts pertaining to the areas the aircraft will be flown through. The pilot may determine that the proposed flight path of the aircraft will take the aircraft through a particular weather system. The pilot may wish to take make a test flight through the system utilizing a flight and weather simulator (e.g., system 100). As discussed above, traditional weather simulation modeling techniques are not ideal because creating the customized weather simulation can be costly, time consuming, inaccurate, and non-realistic. Accordingly, the pilot may not be able to adequately practice the scheduled flight. However, system 100 utilizes weather data to locate a recorded weather event having identical or similar characteristics to the forecasted weather event, and provides the pilot with a realistic simulation of the weather event the pilot may face while flying the scheduled route.

Figure 5:
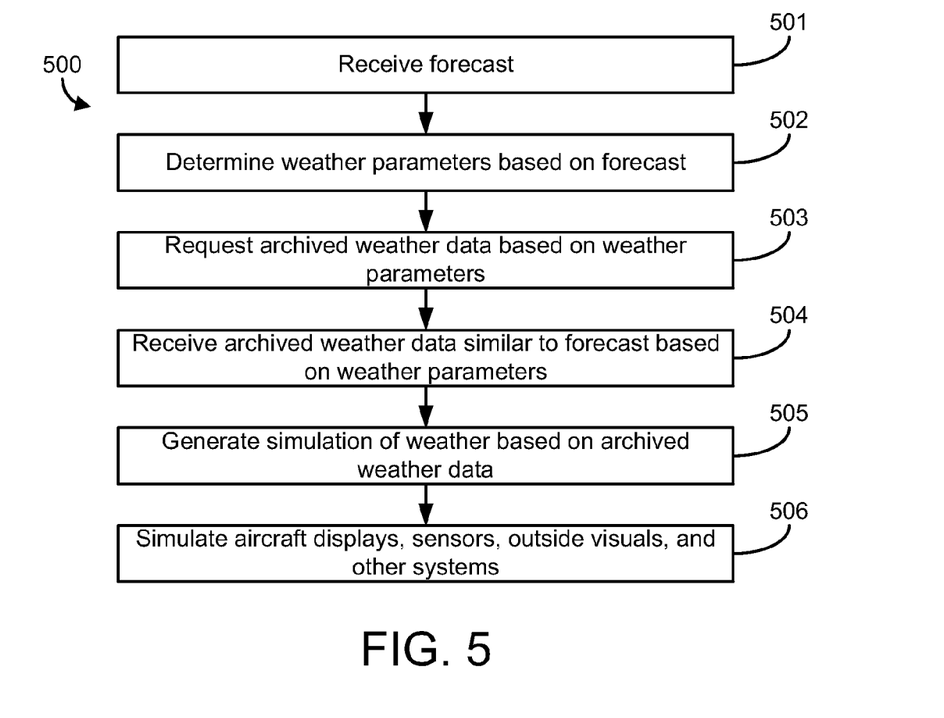
FIG. 5 is a flow chart of an exemplary process for creating an aircraft flight simulation through a weather event.

Referring to FIG. 5, a flow diagram of an exemplary process 500 for creating a simulation (e.g., a flight simulation) through a weather event is shown. A flight simulation system (e.g., simulation system 102) receives a weather forecast for a scheduled flight (step 501). The weather forecast includes information pertaining to the geographic location of the weather event. The weather forecast may be data received from a third party weather service, or may be manually input by a user. The weather forecast includes data pertaining to the expected weather parameters that will be exhibited by the forecasted weather storm.

The weather forecast is analyzed and weather parameters are determined based on the forecast (step 502). The weather parameters relate to any expected conditions of the weather event. The weather parameters may include, but are not limited to, the presence of storm cells, a storm top height, rate of convective growth or decay of the storm, wind, cloud formations, temperature, altitude, geographic locations, geographic areas, precipitation rate, precipitation type, number of storm cells, storm severity, the height of the 500 mb pressure level of the storm, lightning density, max wind speeds, average wind speeds, wind directions, icing information, freezing level information, turbulence parameters, date of weather event, time of weather event, environmental conditions that gave rise to the event, tornado activity, storm structural considerations (e.g., storm cell or hurricane system), dew points, and/or surface wind flows. Any identifiable weather event parameters are extracted from the weather event forecast.

The flight simulation system queries a database containing actual recorded weather data (e.g., weather data store 120) (step 503). The query is based on the determined weather parameters of the forecasted weather event. The database containing the weather data searches stored weather events for events that present an identical match or a close match based on the number of overlapping parameters. If multiple weather events are identified, the options are presented to the user of the flight simulation system for a selection. Alternatively, the closest match is automatically selected and returned to the flight simulation system for processing. In yet another alternate setup, multiple sets of weather data pertaining to multiple historic weather events are returned to the flight simulation system such that the user of the flight simulation system can perform a flight simulation in each of the weather events. In any event, the flight simulation system receives the weather data (e.g., weather data 104) pertaining to at least one identified weather event that matches or most closely matches the weather parameters as determined based on the weather forecast (step 504).

The flight simulation system generates a simulation of a weather model (e.g., weather model 107 based at least in part on the received weather data (step 505). The flight simulation system provides the weather data (e.g., weather data 104) to a simulation engine (e.g., simulation engine 106). The simulation engine is programmed to process the provided weather data into a weather model of the weather event. The weather model may be a spatiotemporal weather model. The weather data received in step 504 may not be continuous data. For example, it is contemplated that the weather data includes a radar volume scan for every five minutes of a weather event.

Accordingly, the flight simulator interpolates the data to create a continuous weather pattern with smooth transitions as opposed to jumps in data every five minutes. Interpolating the data results in a more realistic weather simulation for the user of the flight simulator. The weather model is then applied to the environment that the simulation will take place (e.g., a particular geographic location at a particular date and time for a simulated flight).

After generation of the simulated environment, including the weather model, the flight simulation system simulates aircraft displays, sensors, outside visuals, and any other systems used during the simulation of the flight (step 506). It is contemplated that the flight simulation system includes a second simulation engine (e.g., sensor simulation engine 108) that actively simulates outside visuals, displays, gauges, and sensors (modules) based on user input, position within the simulated environment, and the spatiotemporal weather model. Alternatively, it is contemplated that the flight simulation system includes one simulation engine that accomplishes both the tasks of step 505 and step 506. The second simulation engine receives user input during the simulation (e.g., user adjustments to sensors during the flight) and flight simulation data (e.g., position and speed of the simulated aircraft with respect to the weather model) to continuously perform simulations in order to update the modules present in the flight simulator throughout the duration of the simulated flight.

The second simulation engine simulates outside visuals and sends the simulated visuals to the various displays presented to the user of the simulator (e.g., modules 20 of aircraft simulator system 10). The outside visuals relate to what a pilot would see out of the simulated aircraft's windows. The simulation is based at least in part on the spatiotemporal weather model that was previously created. The simulated visuals may be created from media files (e.g., cloud models and precipitation models) contained within a media database within the flight simulation system. Accordingly, the second simulation engine determines what the pilot would see if looking out the airplane's window at that moment in time based on the simulated aircraft's location and orientation with respect to the spatiotemporal weather model. The second simulation engine modifies the standard media files (e.g., a file pertaining to cloud structure) contained within the media database to closely model what the pilot would see during the simulated weather event.

In some situations, the weather data includes image data of the weather event. The image data is video or still images. In either case, the second simulation engine is configured to analyze image data to further refine the standard weather visuals in order to more closely approximate the actual visuals of historic weather event that the weather simulation is modeled from. In some situations, simulation engine may determine that the image corresponds to an exact view or a near exact view to what a user of the flight simulator would see. Accordingly, the exact image or video is used for the simulated display. Further, simulation engine may determine that the exact video or images are what would be viewed from a ground operation (e.g., the static view from a flight control tower that shares its position with respect to a camera that captured image data of the weather event) in communication with the aircraft. Accordingly, if the flight simulator includes a simulated ground station (e.g., flight simulator control center), the video or images is provided to the simulated ground station.

The second simulation engine simulates other displays and sensors based on the spatiotemporal weather model. For example, the second simulation engine can simulate an onboard, aerial radar display of an aircraft (e.g., an airborne X-band radar display) during the simulated flight. As the simulated aircraft moves through the simulation, the aerial radar display changes as the aircraft's position changes with respect to the weather model. Further, the aerial radar display changes with respect to user adjustments received during the flight simulation (e.g., a user adjusting the radar tilt knob of the airborne radar sensor). Accordingly, the second simulation engine utilizes the plane's position, speed, heading, altitude, the spatiotemporal weather model, and any user input regarding sensor settings to simulate the airborne radar display. Examples of radar simulations include the Rockwell Collins Radar Simulation (formerly Blue Ridge), the NASA Advanced Doppler Weather Radar Simulation (ADWRS), the Camber Weather Radar Simulation, etc. The second simulation engine is not limited to outside visuals and airborne radar displays. It is contemplated that the second simulation engine is operable to simulate any sensor reading at any position within the spatiotemporal weather model (e.g., ground-based radar, airborne-radar, LIDAR sensors, wind speed gauges, wind direction gauges, air pressure sensors, infrared sensors, lightning strike sensors, cockpit displays, etc.) The simulation of the modules is continuous throughout the duration of the simulated flight. Accordingly, the simulated sensor outputs are realistic and closely modeled based on the spatiotemporal weather model.

Simulation system 102 is further operable to simulate an aircraft flight during a user specified weather event based on user provided parameters and/or characteristics. For general training purposes, a pilot may not have a designated weather forecast for a specifically scheduled flight. In this case, the pilot or user of simulation system 102 can provide simulation system 102 with a set of weather parameters or characteristics, or a specific historic weather system (e.g., a named hurricane). In this situation, simulation system 102 functions in a very similar manner to the above described process 500. However, simulation system 102 does not extract weather parameters from a weather forecast prior to querying weather data store 120. Simulation system 102 queries weather data store 120 based on the user provided parameters. Alternatively, simulation system 102 queries weather data store 120 based on a date and location that identifies a previous weather event. The remaining flight and weather simulation functions in largely the same manner as the above described process (e.g., steps 504-506).

Further, it should be appreciated that process 500 is not limited to a single flight simulation. The above described process may be used to simulate multiple flights through the same spatiotemporal weather model (e.g., weather model 107) at the same time period. In this case, the second simulation engine (e.g., sensor simulation engine 108) creates multiple sets of simulated sensors and displays based on the spatiotemporal weather model, simulation information, and user input information. Accordingly, each set of simulated sensors and displays have different outputs because each simulated flight is traveling through a different portion of the weather model (e.g., the first flight may be flying through an eastern portion of a storm system, while a second flight may be flying through a western portion of the same storm system) and because each user may provide different display and sensor adjustments. Each set of simulated displays and sensors may be time-synchronized such that each user is presented information from the same time of the spatiotemporal weather model, but from a different location within the model. Accordingly, the first user may inform the second user of information displayed within the first user's simulation and/or compare it with the second user's information within the same simulated environment and at the same time.

It is further contemplated that the same weather model (e.g., weather model 107) is used by multiple, separate simulation systems (e.g., multiples of system 100). Accordingly, multiple separate systems may be located at geographically distinct locations, and the spatiotemporal weather model is shared between the systems such that multiple users can participate in the same simulation as discussed above. In this case, each system communicates with the same weather model (located at one of the systems or located at a separate host system) at the same time such that each system remains time-synchronized within the same environment. In an alternate arrangement of this concept, the multiple geographically distinct systems each have identical instantiations of the weather model (e.g., weather model 107), and the multiple systems communicate data between each other, including system identifications, simulation data, and time data (e.g., time stamps) such that each system remains time-synchronized within the same environment.

The above described multiple-user concepts may be applied to other simulations scenarios such that multiple users experience the same simulated weather event from different perspectives, and as such, have different displays and sensor outputs based on their individual locations. For example, it is contemplated that a single spatiotemporal weather model may provide the basis for simulated time-synchronized display and sensor outputs for moving ground vehicles, ground station, and multiple aircrafts within the same simulation. The multiple simulations may be performed on the same system or on geographically distinct systems in communication with the same weather model and/or with each other.

Organizing historic weather data as described above with weather data store 120 is useful in non-flight simulation systems. For example, weather data stored in weather data store 120 is useful in any type of weather simulation (e.g., weather prediction models). A meteorologist may find it useful analyze recorded weather data for historic weather events that are similar to developing systems to create better weather forecasts based on historic trends or for training weather spotters. Further, weather data stored in weather data store 120 can be used in various media applications, including animations, computer graphics for television shows and movies, and video games.

Aircraft simulator system 10, simulation system 102, weather data store 120, and radar system 130 include processing circuits each including a processor and memory configured to execute the systems and methods described herein. The memory may store machine instructions that, when executed by the processor, cause the processor to perform one or more operations described herein. The processor may include a microprocessor, ASIC, FPGA, etc., or combinations thereof. The memory may include, but is not limited to, electronic, optical, magnetic, or any other storage or transmission device capable of providing the processor with program instructions. The memory may include a CD-ROM, DVD, magnetic disk, memory chip, ROM, RAM, EEPROM, EPROM, flash memory, optical media, or any other suitable memory from which the processor can read instructions. The instructions may include code from any suitable computer programming language such as, but not limited to, C, C++, C#, Java, JavaScript, Perl, HTML, XML, Python, and Visual Basic.

Aircraft simulator system 10, simulation system 102, weather data store 120, and radar system 130, and modules 20 include one or more user interface devices, which may be any electronic device that conveys data to a user by generating sensory information (e.g., sounds, displays, etc.) and/or converts received sensory information from a user (e.g., user input 110 provided via a keyboard, mouse, microphone, touch screen, etc.). Aircraft simulator system 10, simulation system 102, weather data store 120, and radar system 130 may further include communication interfaces that may be configured to communicate with one another either wirelessly or via a wired connection.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method of simulating a weather pattern for use in a flight simulator comprising a cockpit having a plurality of flight control inputs, the cockpit comprising a seat, a dashboard, and an electronic display in the dashboard, the method comprising:
  receiving, at the flight simulator, an input of a weather forecast for a desired simulated route, wherein the weather forecast is a prediction, made with respect to presently occurring weather events, of weather events in the future;
  determining, by the flight simulator, a set of weather parameters pertaining to the weather forecast, wherein the weather parameters comprise at least a storm top height, the storm cell severity, turbulence parameters, rate of convective growth or decay of a storm, a number of storm cells, a lightning density, or storm structural considerations, wherein the weather parameters are determined from the weather forecast;
  searching, by the flight simulator, a weather event database stored in an electronic, optical, or magnetic memory for a matching weather event using an electronic processor, and the set of weather parameters relating to the weather forecast, wherein the weather event database includes weather data for a plurality of weather events and weather characteristics associated with each of the weather events;
  identifying, by the simulator, the matching weather event, the matching weather event including at least a portion of the set of the weather characteristics matching the set of weather parameters pertaining to the weather forecast;
  receiving, at the simulator, weather data corresponding to the matching weather event;
  creating; by the simulator, a model of the matching weather event using the weather data;

simulating a flight of an aircraft through the model including creating simulated display data based the position of the aircraft within the model;

receiving, at the simulator, flight control signals from the flight control inputs wherein the flight control signals control the simulated flight of the aircraft;

and providing a visual on the electronic display of the cockpit based upon the simulated display data, updating the visual on the electronic display based on changes to the simulated display data.

2. The method of claim 1, wherein the weather data includes radar data associated with a first time interval, wherein the radar data is interpolated for times within the first time interval.

3. The method of claim 1, further comprising simulating the sensor based at least in part on a simulation of the model.

4. The method of claim 1, wherein creating the model of the matching weather event comprises creating a spatiotemporal model of the matching weather event.

5. The method of claim 1, wherein the electronic display in the dashboard further comprises: a screen representing a cockpit window, a plurality of displays representing cockpit instruments and sensor displays; and wherein the visual is provided on the screen and plurality of displays.

6. The method of claim 5, further comprising simulating a display of a ground station based at least in part on the model of the matching weather event.

7. A simulator system comprising:

a flight simulator comprising a cockpit having a plurality of flight control inputs and an electronic display, the electronic display being disposed in a dashboard of the cockpit, the flight simulator configured to receive an input of a weather forecast for a desired simulated route, wherein the weather forecast is a prediction of future weather, wherein the simulator is further configured to simulate a desired weather event associated with the weather forecast in a simulated environment;

a display configured to display the desired weather event in the simulated environment;

and a database containing weather data, wherein the weather data pertains to stored weather events;

wherein the simulator is configured to simulate the movement of the aircraft and further configured to simulate visual and sensor data based on the positioning of the aircraft;

wherein the simulator is configured to locate the weather data pertaining to the desired weather event by matching weather parameters associated with the weather forecast with stored weather characteristics associated with the stored weather events, wherein a set of weather characteristics matches the weather parameters, wherein the weather parameters are determined from the weather forecast; and wherein the simulator is configured to simulate the desired weather event based at least in part on the weather data such that simulation of the desired weather event at least partially models the stored weather event, receive flight control signals from the flight control inputs, and provide simulated movement of the aircraft based upon the flight control inputs, wherein a visual is provided on the electronic display of the cockpit or on a sensor of the cockpit based upon the simulated movement and the desired weather event.

8. The simulator system of claim 7, wherein the weather data originated from the National Climatic Data Center.

9. The simulator system of claim 7, wherein the database includes image data pertaining to the stored weather events.

10. The simulator system of claim 9, wherein the simulator is configured to simulate the desired weather event based at least in part on the image data pertaining to the stored weather events.

11. A simulator system comprising:

a flight simulator comprising a cockpit having a plurality of flight control inputs and at least one haptic feedback device, the flight simulator configured to receive an input of a weather forecast for a desired simulated route, wherein the weather forecast is a prediction of a future weather event, wherein the simulator is further configured to simulate a desired weather event associated with the weather forecast in a simulated environment;

a display configured to display the desired weather event in the simulated environment; and a database containing weather data, wherein the weather data pertains to stored weather events;

wherein the simulator is configured to locate the weather data pertaining to the desired weather event by matching weather parameters associated with the weather forecast with stored weather characteristics associated with the stored weather events, wherein a set of weather characteristics matches the weather parameters, wherein the weather parameters are determined from the weather forecast; and wherein the simulator is configured to simulate the desired weather event based at least in part on the weather data such that simulation of the desired weather event at least partially models the stored weather event according to a model, wherein a visual is provided based upon the model and the simulator is configured to provide haptic feedback using the haptic feedback devices based upon the model;

wherein the simulator is further configured to simulate the flight of the aircraft though the model and also configured to simulate the visual based on the position of the aircraft within the model.

12. The simulator system of claim 11, wherein the weather data originated from the National Climatic Data Center.

13. The simulator system of claim 12, wherein the database includes image data pertaining to the stored weather events.

14. The simulator system of claim 11, further comprising an electronic display, the electronic display being disposed in a dashboard of the cockpit.

15. The simulator system of claim 14, wherein the visual is provided on the electronic display of the cockpit.

16. The simulator system of claim 11, further comprising an electronic sensor in the cockpit, wherein the visual is provided on the sensor of the cockpit.

17. The simulator system of claim 14, wherein the visual is provided on the electronic display of the cockpit, wherein the visual represents a weather radar image.

18. The simulator system of claim 11, wherein the flight control inputs include a yoke.

19. The simulator system of claim 14, wherein the flight control inputs include a thrust control.

20. The simulator system of claim 7, the electronic display further comprises: a screen representing a cockpit window, a plurality of displays representing cockpit instruments and sensor displays; and wherein the visual is provided on the screen and plurality of displays.

* * * * *